United States Patent Office 2,714,073
Patented July 26, 1955

2,714,073

METHOD OF AMPLIFYING PAINT MIXTURES

John F. Greene, Queens Village, N. Y.

No Drawing. Application March 3, 1953,
Serial No. 340,147

1 Claim. (Cl. 106—207)

The invention disclosed herein relates to paint amplifiers. It is particularly concerned with a water emulsion product that is economical and simple to make and which may be readily mixed in with ready prepared paints without impairing the qualities of the latter, and the invention is further concerned with a new and novel process for making water emulsion paint amplifiers of this type.

It is called a paint amplifier because it may be added to prepared paints in such manner as to double the volume of the latter. It is economical to manufacture inasmuch as it is composed largely of water and other inexpensive materials. Besides, it can be readily and quickly made up in large batches with very little labor, equipment or expense. The product of the present invention has further advantages in that it is readily miscible with conventional prepared paints, such as oil paints, enamels and flats. The resulting paint mixture not only retains the general characteristics of the original paint, but is improved in quality and, when used is durable, does not readily dry out or peel.

A further advantage of the paint amplifier of the present invention is to fix the paint with which it is mixed in such manner that the oils and other ingredients of the resulting mixture will not tend to separate nor skin out. This is of decided advantage and prevents the waste and expense that so often arises when unused paints are left standing and the oils thereof separate and skin.

The amplifier is produced in a concentrated form to which further water is added. The concentrate as increased by the water may, when desired, be mixed in with ready prepared paints, and the qualities of the original paint will not be impaired in any way by the mixture.

An object of the invention is, therefore, a paint amplifier wherein a principal ingredient is water.

Another object of the invention is a water paint concentrate that is readily miscible with prepared paints, particularly oil paints, and in such manner that the resulting mixture is an improved paint of greater volume having a long life, not given to peeling and wherein the oils do not tend to separate from the body of the paint on standing.

A further object of the invention is a water emulsion paint amplifier that can be quickly and readily manufactured in large batches.

A still further object of the invention is a simple and economical process for manufacturing a water emulsion paint amplifier in large quantities.

The foregoing objects and advantages of this invention, as well as others, will become increasingly apparent as this specification unfolds in greater detail.

In preparing the paint amplifier of the present invention I prefer to use ingredients of the following proportions:

5 lbs. of rosin
2 gals. of methyl alcohol
3 lbs. gum arabic
2 lbs. of lead acetate
2 lbs. of zinc acetate
1 lb. of caustic soda
1 lb. of water glass
1 lb. of Irish moss
Water sufficient to make 50 gals. of the concentrate.

The ingredients may be separated into four groups as follows:

Group 1: 5 lbs. of rosin dissolved in 2 gals. of methyl alcohol

Group 2: 3 lbs. of gum arabic dissolved in a small amount of water

Group 3: 20 gals. of water in which has been stirred
    2 lbs. of lead acetate,
    2 lbs. of zinc acetate,
    1 lb. of caustic soda,
    1 lb. of water glass, and
    1 lb. of Irish moss.

Group 4: Sufficient water added to the above three groups to make 50 gals. of the concentrate.

In the process of preparing the paint amplifier concentrate I prefer to proceed as below:

1. Dissolve 5 lbs. of rosin in 2 gals. of methyl alcohol and allow the result to stand for twenty-four hours;

2. Dissolve 3 lbs. of gum arabic in a small quantity of water;

3. Put 20 gals. of water in a 50 gal. barrel. Add to the water 2 lbs. of lead acetate, 2 lbs. of zinc acetate, 1 lb. of caustic soda, 1 lb. of water glass and 1 lb. of Irish moss. Stir the contents well for about five minutes;

4. To the stirred contents of step 3 above add the dissolved rosin and the dissolved gum arabic. Then add sufficient water to fill the barrel. The barrel with its contents is then allowed to stand for a few hours, during which the ingredients will fully mix with one another to form a concentrated emulsion product. This 50 gals. is known as the concentrate or extract; and To each gallon of the concentrate formed as above 9 gals. of water are added to form 10 gals. of paint amplifier. Before adding the water it is desired that the concentrate be well strained through a screen, preferably of fly wire mesh.

The paint amplifier is used by mixing a given quantity of it with an equal quantity of ready prepared paint. Before mixing, the paint is prepared in the usual manner for use in accordance with the manufacturer's directions, the paint amplifier is then thoroughly mixed in with it. The two will mix uniformly. Should the resulting product be too heavy for convenient application, it is thinned in conventional manner by the addition of suitable thinners, such as oils or turpentine; it is not to be thinned by the addition of more paint amplifier. The qualities of the original prepared paint will not be impaired in any way by mixing it with the amplifier.

The amplified paint is applied in usual manner over the surface to be painted. The painted surface when dried and subjected to the weather will prove that neither the quality nor the durability of the original paint to have been impaired; it will further show itself to have long life, free of blistering, peeling and corrosion. Unused portions of the amplified paint may be left standing in the closed can for long periods without skinning of the oils or separation of the pigment from the vehicle.

While a preferred method and ingredients for making a paint amplifier have been described herein by way of illustration, the invention is not to be limited thereby, but is intended to cover any variation therefrom which falls within the spirit of the invention and the scope of the claim.

I claim:

A method of amplifying ready mixed commercial oil paint, comprising first, dissolve 5 lbs. of rosin in 2 gals. of methyl alcohol and allow the result to stand for twenty-four hours; next, dissolve three lbs. of gum arabic in a small amount of water; third, stir in 20 gals. of water for about 5 minutes 2 lbs. of lead acetate, 2 lbs. of zinc acetate, 1 lb. of caustic soda, 1 lb. of water glass, and 1 lb. of Irish moss; fourth, add the dissolved rosin and the dissolved gum arabic to the contents of step third and add sufficient water to make a total of 50 gallons; fifth, allow the latter to stand for a few hours; sixth, mix 9 gallons of water to each gallon of the 50 gallons to make a total of 450 gallons; and to each of the 450 resultant gallons mix well one gallon of thoroughly mixed commercially prepared oil paint.

References Cited in the file of this patent

UNITED STATES PATENTS

| | | |
|---|---|---|
| 614,050 | Hamilton | Nov. 8, 1898 |
| 1,422,114 | Mackenzie | July 11, 1922 |
| 1,765,616 | Roman et al. | June 24, 1930 |
| 1,945,149 | Lasher | Jan. 30, 1934 |